Patented July 9, 1940

2,207,339

UNITED STATES PATENT OFFICE 2,207,339

GYPSUM COMPOSITION

Thomas P. Camp, Glen Ellyn, Ill., assignor to United States Gypsum Company, Chicago, Ill., a corporation of Illinois

REISSUED

DEC 10 1946

No Drawing. Application June 20, 1936, Serial No. 86,346

5 Claims. (Cl. 154—2)

This invention relates to plastic compositions which are formed by mixing a plastic cementitious material, particularly calcium sulfate hemihydrate (plaster of Paris), with water, forming the material while in wet or plastic condition into the desired shapes, and permitting the composition to set, harden or crystallize in the shape to which it has been molded.

One of the primary objects of the invention is to produce an improved form of plastic composition in which a definite type of modified starch having a predetermined and definite viscosity is employed in the calcium sulfate hemihydrate slurry, so as to give thereto certain desirable properties, as will be more fully explained hereinbelow. The use of the special type of modified starch forms one of the essential features of the invention and is to be distinguished from prior art methods, processes and products in which ordinary starch has been employed in a manner which bears some superficial resemblance to what is about to be described herein.

In the manufacture and use of gypsum wallboard considerable difficulty has been encountered due to the fact that as originally manufactured it weighed from 1900 to 2100 pounds per thousand square feet of ⅜-inch thick board. This was too heavy and unwieldy for convenient handling by building mechanics and was costly to ship any but short distances. The weight of this board has been gradually reduced by the various manufacturers to approximately 1600 pounds per thousand square feet of ⅜-inch thick board. Attempts to reduce this weight still further by known processes have not been entirely successful either because of the extreme fragility of the core when dry or because the excessive amount of water required in many of these processes is difficult to remove economically, or for other reasons directly related to the particular process involved, as shown below.

It is well known that the dry density of cementitious casts may be reduced by increasing the amount of water used in making up the original plastic mix from which the cast is made. This method is effective, however, only until the point is reached where pronounced settling will occur before the shape hardens or, in the case of wallboard, where the fluidity of the mix is such that it will not retain the molded shape even when restrained by fibrous cover sheets.

Since the range of weight which can be obtained in this manner is relatively limited, the method was improved by the substitution of a suspension of cooked natural starch for the excess water formerly used. By properly selecting the concentration of starch in water, it is possible to add almost unlimited quantities of the cooked starch suspension to a gypsum slurry without materially altering the fluidity of the mix; thus practically any desired weight may theoretically be obtained in this manner. In practice it has been found, however, that the evaporation of the relatively enormous amounts of water is materially retarded by the cooked natural starch, which results in costly drying, and that in addition, due to the extreme distention of the gypsum crystals required for low density products, there is an appreciable shrinkage during the drying process.

Another method of reducing weight is by the addition of water-swollen fibers which contract upon drying, leaving voids in the mix. Here again the water to be evaporated is excessive, resulting in a soft, weak core.

Still other methods include the use of light aggregates such as cork, pumice, etc., and the employment of a gas-reaction, liberating a gas in situ to form voids.

All of these methods have definite economic as well as practical limitations, which become immediately apparent to those skilled in the art.

A singularly effective and economical way of reducing the weight of a wallboard or other shape is by the incorporation of a stable foam in a mixture of calcium sulfate hemihydrate and water, with or without other ingredients as needed to modify or obtain certain desired properties. Upon setting, the foam is entrapped in a matrix of set plaster and reduces the weight to the degree desired.

Briefly, this process comprises producing a light, stable, strong-walled, uniformly cellular foam from a solution of casein (or animal) glue and rosin soap (or other foaming agent, such as soap bark or other glucoside), and incorporating the same in a cementitious plaster mix comprising calcium sulfate dihydrate, water, relatively small amounts of dry corn or wheat flour paste (for wallboard), fiber and other reagents as required to control the setting time. By this process cellular products of comparatively low density can be produced. The small amount of fiber added to the mix increases the toughness of the core and reduces its susceptibility to shock. The dry corn or wheat flour paste is added in wallboard to improve, strengthen and protect the natural bond of the calcium sulfate dihydrate crystals with the paper cover sheet.

Though this process is used to an economical advantage in the production of a 1600-pound gypsum wallboard, it was found that to produce a still lighter gypsum product it would be more economical and convenient to employ my invention. To illustrate the advantages obtained in producing gypsum products with my plastic composition, I shall first briefly describe the conventional method used to produce a gypsum wallboard.

A mixture containing calcium sulfate hemihydrate, dry wheat or corn flour paste, wood fiber and, if desired, a very small amount of commercial retarder is deposited on a moving belt which passes under a series of showers or through a pond of water formed by a depression of the central portion of the belt, until the mixture is soaked with water. Upon this soaked mixture is deposited a previously prepared light, stable foam obtained by agitating a solution of casein (or animal) glue and rosin soap in an especially designed whipper or foam cell. This soaked slurry, with the foam, is discharged from the belt into a mechanical mixer, where the foam is thoroughly dispersed throughout the soaked slurry. The thoroughly blended cellular slurry is somewhat viscous and of the proper semi-fluid consistency for proper shaping. It is deposited in a continuous stream between paper liners and uniformly distributed by a master roll which also controls the thickness of the finished board. The formed board is conveyed slowly in one continuous sheet until the core is set, when it is cut into the desired lengths, passed through the drying kiln and placed in storage or shipped, as required.

To be usable, this board must have a strong core, capable of withstanding any normal shock or stress, and the bond between the cover sheets and the core must be such that the paper cannot be separated from the core by any breaking or tearing action to which the board may be subjected.

It is generally considered that when calcium sulfate hemihydrate is hydrated, the water used to bring the mix to a plastic state becomes saturated with calcium sulfate dihydrate. This crystallizes from the saturated solution in the form of long, slender needles that intertwine and interlace with each other to form an apparently solid crystalline mass but which actually possesses a sieve-like structure the dimensions depending upon the density of the mass.

From this it may be readily understood that where the crystals are widely dispersed, as in any solid cast made by the use of excess water, either free, as a natural starch suspension, or other form, the finished cast will have a spongy structure with high water absorption and low compressive strength, whereas a cellular shape made without excess water has the gypsum crystals concentrated in small, dense, interconnecting masses and will have higher compressive strength at the same gross density.

The explanation of good bond is not definitely known, but it is believed that during the setting process some of the crystals of calcium sulfate dihydrate are deposited partially within the surface of the fiber cover sheets, thus forming a mechanical bond. Upon drying at low temperatures (not over 150° F.), these crystals retain their strength and, therefore, good bond. This type of drying is slow and costly. Therefore it has become common practice to use temperatures as high as 500° F. in drying this product. This forced drying may result in the calcination or dehydration of the gypsum crystals, causing complete loss of bond. To counteract this, a small amount of a dry corn or wheat flour paste containing from 8% to 15% of water-soluble material is frequently added to the core mixture. During the drying process the water-soluble portion migrates, with the water, through the molecular interstices of the core to the interface between the core and the paper liner, where it concentrates either because the water becomes vapor at this point or because it is filtered out by the paper as the water passes through. At this point, because of its water-holding power, it surrounds the fine needles of gypsum penetrating the paper with water, thus preventing their calcination or dehydration.

Various attempts by skilled mechanics to produce a board weighing appreciably less than 1600 pounds per thousand square feet ⅜ inch thick, by increasing the amount of foam described above, resulted in a weak unsatisfactory board. The use of cooked natural starch and other water carriers such as paper pulp increased the amount of water to be evaporated to such an extent that the process was not economically feasible, due to the increased drying time required, although the completed product was fairly satisfactory from a quality standpoint.

Attempts to use a combination of the foam process together with a cooked natural starch resulted in the production of boards with very poor bond and a tendency to form "blisters" or areas showing either a separation of the cover sheet from the core or an actual separation of the core, due to the fact that in cellular casts the areas of cementitious material are more dense than in non-cellular casts of the same density as shown above, with the result that the water-swollen but not soluble starch particles were filtered out inside the cast, preventing migration of the soluble portion of the dry paste added.

Plaster products immediately after setting contain a considerable excess of water which must be removed by either natural or artificial means. To drive it off quickly, relatively high temperatures are ordinarily maintained until the greater portion of the excess water is removed, when the temperature is reduced to a point where it will have no substantial effect on the water of crystallization contained in the hydrated calcium sulfate molecule. At times, however, it is difficult to maintain proper control of drying temperatures, and frequently the surfaces of the products will become calcined, soft and powdery. Again, potteries and other industries using plaster molds will encounter trouble due to thermal shocks. In practice, relatively large molds, after removal from the drying kiln and on exposure to cold air, may crack from the shock caused by the temperature difference. I have found that my invention will overcome this tendency to a marked degree, as well as tend to prevent calcination of the surfaces of gypsum products which are exposed to unduly high temperatures for a relatively short time.

It is therefore an object of this invention to provide a plastic composition and product less susceptible to fracture by thermal and/or physical shocks than set neat gypsum.

An additional object of this invention is to provide a plastic composition and product containing ingredients a portion of which possess the property of migrating through the interstices of the set plastic composition to the surface and forming thereon a protective coating against the deteriorating effects of heat.

A further object of the invention is to provide a plastic composition and product containing ingredients a portion of which possess the property of migrating through the molecular interstices of the plastic composition to the surface, reinforcing said surface and aiding the natural bond of calcium sulfate dihydrate to fibrous cover sheets or liners.

A still further object of my invention is to provide a plastic composition and product suitable for use as a core for plaster wallboard in connection with or without a process for producing a cellular lightweight product.

These and other objects, uses, advantages and various adaptations of my invention will become immediately apparent to those skilled in the art. The following is a detailed description of my invention:

The preferred ingredients of my plastic composition are principally calcium sulfate hemihydrate and a specially prepared modified starch with definite properties. Such a starch may be made by mixing raw starch with water containing a small percentage of nitric acid, filtering and drying the resulting product. Other ingredients well known to the art may be added to modify and vary the physical properties as desired.

In using my invention for gypsum wallboard, I slightly modify the foam process described above to obtain better results. It is obvious that it is not necessary to use the exact materials described herein, since there are equivalents that will perform in substantially the same manner.

As an illustration of one of my preferred formulas for a wallboard core for use with foam, I use the following ingredients in producing a ⅜-inch thick wallboard weighing approximately 1350 pounds per thousand square feet:

| | |
|---|---|
| Calcium sulfate hemihydrate ___ pounds __ | 1000 |
| Dry corn or wheat flour paste _____ do ____ | 3 |
| Rosin soap _____ do ____ | 2½ |
| Modified starch _____ do ____ | 13 |
| Fiber _____ do ____ | 27 |
| Commercial retarder (approx.) __ ounces __ | 2 |

For convenience the required amounts of dry paste, calcium sulfate hemihydrate, fiber and retarder are mixed dry and then mixed with sufficient water in a mixer. Simultaneously a stable fluid foam weighing between 10 and 30 pounds per cubic foot, produced by whipping a modified starch and rosin soap solution prepared in the manner described below, is added to the mix. This mix is thoroughly blended to a uniform, plastic mass, using a second mixer if required, and deposited on the fibrous liner to be formed into board in the conventional manner. The dry paste may be omitted, but I have found that under certain conditions it aids in obtaining a more positive bond to the fibrous liners upon drying.

In preparing the foam I prefer to use approximately 140 pounds of modified starch, possessing definite physical properties described below, with from 20 to 40 gallons of cold water. This is stirred well until all lumps are broken down and a smooth mixture of starch and water is obtained. While this mix is costantly agitated, heat is applied until the mix reaches a temperature of 190° to 200° F., when the mixture becomes transparent, indicating that the starch is cooked. This solution is then diluted with water to from 5% to 15% starch content and mixed until uniform. The foaming agent is then added and the combined solution poured into a foam cell or whipper in required amounts.

If it is desired to make other than cellular gypsum products, the diluted starch solution may be added directly to the mixer and the plastic mix molded or cast into any desired form. As a matter of convenience, a specially prepared dry starch may be added to the dry mix and dispersed therein before the addition of the water. However, for cellular products I have found that better efficiency and foam stability are obtained by adding it to the foaming agent. The foaming agent may be a rosin soap. If this is used, it is mixed with warm water at approximately 150° F. in the proportion of 1½ pounds per gallon of water to bring it to the proper condition for addition to the starch solution. This solution is added to the starch solution in an amount sufficient to produce a foam of the desired properties when the mixture is agitated briskly in a foam producing device.

Though I prefer to use 13 pounds of modified starch, possessing physical properties as described below per thousand square feet of ⅜-inch thick gypsum board weighing 1350 to 1400 pounds per thousand square feet, it is possible to vary this amount within certain limits, depending upon the type of process used in producing the cellular structure, the purity of the calcium sulfate hemihydrate, the type and weight of core desired, the type of fibrous cover sheets used, etc. For producing cellular products by other processes, the optimum amount of starch may be readily determined. The quantity may be varied from 2 to 75 pounds per thousand pounds of calcium sulfate without departing from the spirit of my invention.

A normal or unmodified starch, when cooked in the manner described above and in the same concentration, will yield a very thick viscous gel when cold. Upon great dilution, the more colloidal portions will remain in suspension while the heavier or insoluble portions, consisting of starch cell sacs known as amylo pectin, will settle out. In this type of starch, commonly used in board manufacture, the true soluble matter, as crystalloid, determined by dyalysis, is of the order of .1% or less. The swollen cell sacs have a marked tendency to obstruct the molecular interstices of set plaster and thus retard the drying of the plaster. In addition, if present in large amounts, they prevent the migration of the soluble or colloidal portions of the dry paste to the surface, thus hindering the formation or retention of satisfactory bond.

A modified starch as used in my invention will develop a true colloidal solution which on dilution to 50 times its volume will disperse freely without appreciable sediment. This type of starch has no tendency to prevent migration and will in itself migrate to a marked extent.

It is known that a great number of modified starches are available. However, I have found that for the best results any starch, either natural or modified, or a mixture thereof, which when tested for viscosity in the manner described below will have a viscosity of from about 30 to about 150 seconds, is suitable for use in my invention. A natural starch cooked as described will not flow from a pipette. In practicing my invention, I prefer the use of starch having a viscosity of approximately 40 seconds.

The equipment necessary to determine the viscosity of starch consists of a standard Dudley viscosity pipette, furnished by the Fisher Scientific Company, a wooden stirring paddle, a water bath, a thermometer, a stop watch and a 600 cc. beaker, and other general laboratory paraphernalia. Place the beaker in the boiling water bath and add 200 cc. of cold distilled water. Immediately add 30 grams of starch and stir to remove all lumps with the wooden paddle for five minutes at approximately 100 revolutions per minute. At the end of this time remove the paddle, insert a thermometer, and cover the beaker with a watch glass to prevent the evaporation of water. Allow the starch solution to remain undisturbed for five minutes, at the end of which time it should be approximately 95° C. The watch glass is removed, the solution stirred slowly for one minute, and two viscosity tests are made, noting the time, in seconds, for 100 cc. of starch solution to run out of the viscosity pipette. It is essential that the pipette be held in a vertical position and that the temperature be maintained at the exact point and as close as possible to 95° C. Two or more duplicate tests should be made on each sample of starch and should agree within a second of each other.

I would state, in conclusion, that while the examples described constitute practical embodiments of my invention, I do not wish to confine myself specifically to these details, since manifestly the same may be considerably varied without departing from the spirit of the invention as defined in the appended claims.

Having described my invention, I claim as new and desire to secure by Letters Patent:

1. The improvement in the manufacture of gypsum-core wallboard which comprises the step of incorporating with a calcined gypsum slurry, prior to its being placed between the paper liners of the board, a solution of a water-soluble, readily dispersible, colloidally modified starch having the property of migrating to the interface between the core and cover sheets on drying of the board, said starch being characterized and identifiable by having a viscosity of from 30 to 150 seconds at 95° F. when dissolved in water in the proportion of 30 grams thereof to 200 cubic centimeters of water.

2. In the manufacture of gypsum-core wallboard, the improvement which comprises adding to a calcined gypsum slurry, prior to its being placed between the paper liners of the board, from about 0.2% to about 7.5% of a water-soluble, readily-dispersible, colloidally modified starch characterized and identifiable by having a viscosity of from 30 to 150 seconds at 95° F. when dissolved in water in the proportion of 30 grams thereof to 200 cubic centimeters of water.

3. In the manufacture of gypsum-core wallboard, the improvement which comprises mixing with a calcined gypsum slurry a foam containing a solution of a water-soluble starch characterized and identifiable by having a viscosity of from 30 to 150 seconds at 95° F. when dissolved in water in the proportion of 30 grams thereof to 200 cubic centimeters of water.

4. The process of making a lightweight, paper-covered, gypsum-core wallboard which comprises the steps of preparing a mixture of a large quantity of calcium sulfate hemihydrate with small quantities each of dry cereal adhesive fiber and retarder, preparing a suitable fluid foam from a solution of a foaming agent and a water-soluble starch characterized and identifiable by having a viscosity between 30 and 150 seconds at 95° F. when dissolved in water in the proportion of 30 grams thereof with 200 cubic centimeters of water, gauging the first named mixture with water to form a slurry, adding the said foam thereto, depositing the resulting mixture on a fibrous web and covering it with a second similar web, and effecting the setting of the thus formed core in adhesion with said webs.

5. The process of making a light-weight, paper-covered, gypsum-core wallboard which comprises the steps of preparing a mixing of about 1,000 pounds of calcium sulfate hemihydrate, about 3 pounds of a dry cereal adhesive, about 27 pounds of fiber and about 2 ounces of commercial retarder; preparing a suitable fluid foam weighing between 10 and 30 pounds per cubic foot by whipping an aqueous solution of rosin soap and of a modified starch, which latter is characterized and identifiable by having a viscosity of from 30 to 150 seconds at 95° F. when dissolved in water in the proportion of 30 grams thereof to 200 cubic centimeters of water; gauging the aforesaid mixture with water to form a slurry and incorporating and blending therewith the aforementioned foam to produce a plastic mass; depositing the latter on a fibrous liner, applying a second fibrous liner thereto and effecting the setting of the thus formed core in adhesive contact with and adhering to said fibrous liners.

THOMAS P. CAMP.